United States Patent
Soda et al.

(10) Patent No.: US 11,753,956 B2
(45) Date of Patent: Sep. 12, 2023

(54) SEAL STRUCTURE FOR GAS TURBINE ROTOR BLADE

(71) Applicant: IHI Corporation, Koto-ku (JP)

(72) Inventors: Yoshinori Soda, Tokyo (JP); Tsuyoshi Takemoto, Tokyo (JP); Jun Tateishi, Tokyo (JP); Tomotake Ogawa, Tokyo (JP); Misato Mori, Tokyo (JP)

(73) Assignee: IHI Corporation, Tokyo (JP)

( * ) Notice: Subject to any disclaimer, the term of this patent is extended or adjusted under 35 U.S.C. 154(b) by 1094 days.

(21) Appl. No.: 16/204,183

(22) Filed: Nov. 29, 2018

(65) Prior Publication Data
US 2019/0093493 A1  Mar. 28, 2019

Related U.S. Application Data

(63) Continuation of application No. PCT/JP2016/071714, filed on Jul. 25, 2016.

(51) Int. Cl.
*F01D 11/00* (2006.01)
*F01D 5/14* (2006.01)
(Continued)

(52) U.S. Cl.
CPC ............ *F01D 11/006* (2013.01); *F01D 5/147* (2013.01); *F01D 5/22* (2013.01); *F01D 5/3007* (2013.01);
(Continued)

(58) Field of Classification Search
CPC .... F01D 11/005; F01D 11/006; F01D 11/008; F01D 5/147; F01D 5/22; F01D 5/3007;
(Continued)

(56) References Cited

U.S. PATENT DOCUMENTS 3,748,060 A * 7/1973 Hugoson ............... F01D 5/3015
                                                        416/92
4,872,812 A * 10/1989 Hendley .................. F01D 5/22
                                                        416/190
(Continued)

FOREIGN PATENT DOCUMENTS

JP        2-188602        7/1990
JP        9-303107        11/1997
(Continued)

OTHER PUBLICATIONS

Extended European Search Report dated Feb. 19, 2020, in Patent Application No. 16910452.8, 8 pages.
(Continued)

*Primary Examiner* — Brian P Wolcott
*Assistant Examiner* — Jesse M Prager
(74) *Attorney, Agent, or Firm* — Oblon, McClelland, Maier & Neustadt, L.L.P.

(57) ABSTRACT

A seal structure for a gas turbine blade including a shank including a first side surface, a second side surface, and a bottom surface located radially inward from a fin. The first side surface has a recess movably housing a wedge seal, and a slot on the bottom surface as an insertion opening for a spline seal. The second side surface has a slot on the bottom surface as the insertion opening. The recess has an inclined surface extending straight radially inward and away from the first side surface. The wedge seal includes a wedge portion including a first wedge surface to be opposed to the inclined surface and a second wedge surface to be opposed to the second side surface of the adjacent rotor blade to form a wedge together with the wedge surface, and a weight portion positioned radially inward in the recess from the wedge portion.

6 Claims, 4 Drawing Sheets

(51) Int. Cl.
*F01D 5/22* (2006.01)
*F01D 5/30* (2006.01)

(52) U.S. Cl.
CPC ...... *F05D 2220/32* (2013.01); *F05D 2240/55* (2013.01); *F05D 2240/80* (2013.01); *F05D 2250/23* (2013.01)

(58) Field of Classification Search
CPC ............ F05D 2220/32; F05D 2240/55; F05D 2240/80; F05D 2250/11; F05D 2250/23; F16J 15/061; F16J 15/0806; F16J 15/0887
See application file for complete search history.

(56) References Cited

U.S. PATENT DOCUMENTS

| | | | |
|---|---|---|---|
| 4,936,749 A | 6/1990 | Arrao et al. | |
| 5,478,207 A | 12/1995 | Stec | |
| 5,924,699 A | 7/1999 | Airey et al. | |
| 6,086,329 A | 7/2000 | Tomita et al. | |
| 6,561,764 B1 * | 5/2003 | Tiemann | F01D 5/3015 416/193 A |
| 7,322,797 B2 * | 1/2008 | Lee | F01D 5/22 416/193 A |
| 8,322,990 B2 * | 12/2012 | Hunt | F01D 25/06 416/119 |
| 2004/0228731 A1 | 11/2004 | Lagrange et al. | |
| 2008/0181779 A1 | 7/2008 | Decardenas | |
| 2010/0028135 A1 | 2/2010 | Hunt et al. | |
| 2010/0111700 A1 | 5/2010 | Kim et al. | |
| 2011/0229344 A1 | 9/2011 | Johnson | |
| 2012/0121423 A1 | 5/2012 | Honkomp et al. | |
| 2013/0012181 A1 | 5/2013 | Alquier et al. | |
| 2014/0308133 A1 | 10/2014 | Gendraud et al. | |
| 2015/0037167 A1 | 2/2015 | Simon-Delgado et al. | |
| 2015/0064012 A1 | 3/2015 | Heaven et al. | |

FOREIGN PATENT DOCUMENTS

| | | |
|---|---|---|
| JP | 10-196309 | 7/1998 |
| JP | 10-252413 | 9/1998 |
| JP | 11-62502 | 3/1999 |
| JP | 2004-340144 | 12/2004 |
| JP | 2010-38165 | 2/2010 |
| JP | 2011-32985 | 2/2011 |
| JP | 2012-102735 | 5/2012 |
| JP | 2014-533340 | 12/2014 |
| JP | 2015-31289 | 2/2015 |
| JP | 2015-48846 | 3/2015 |
| WO | WO 2013/188731 A1 | 12/2013 |

OTHER PUBLICATIONS

International Search Report dated Sep. 20, 2016 in PCT/JP2016/071714, filed on Jul. 25, 2016.
Written Opinion dated Sep. 20, 2016 in PCT/JP2016/071714, filed on Jul. 25, 2016.

* cited by examiner

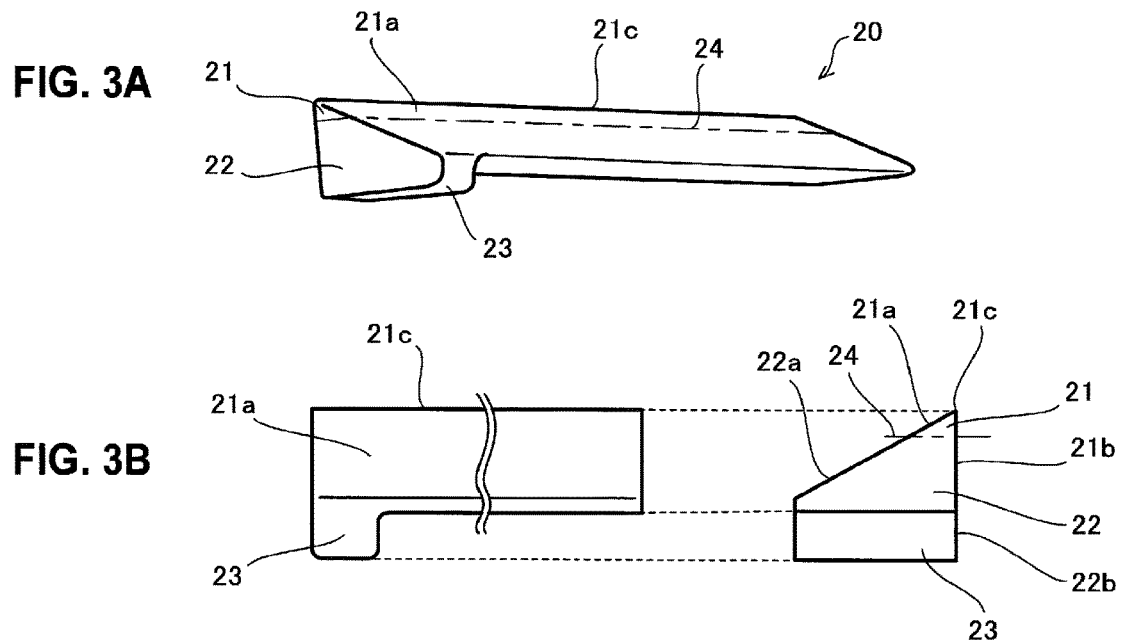
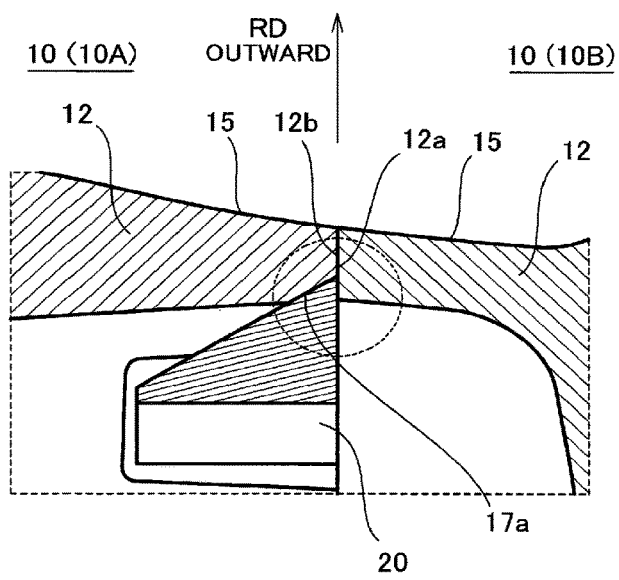
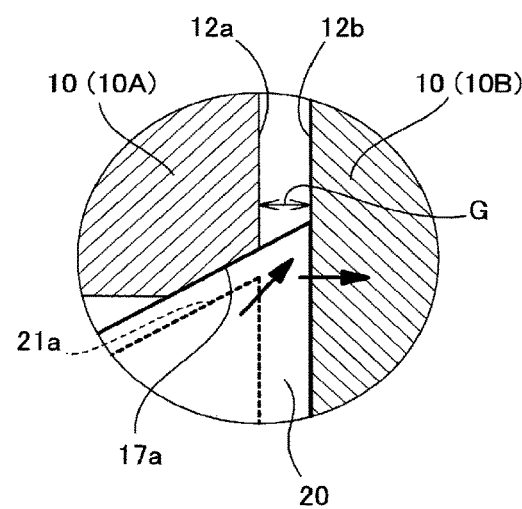

SEAL STRUCTURE FOR GAS TURBINE ROTOR BLADE

CROSS REFERENCE TO RELATED APPLICATIONS

This application is a continuation application of International Application No. PCT/JP2016/071714, now WO2018/020548, filed on Jul. 25, 2016, the entire contents of which are incorporated by reference herein.

BACKGROUND

1. Technical Field

The present disclosure relates to a seal structure for a rotor blade used in a gas turbine (a gas turbine rotor blade).

2. Description of the Related Art

Conventional gas turbines include a plurality of rotor blades fixed to an outer periphery of a rotor disk. Each rotor blade includes a blade body, a shroud provided at a tip of the blade body, and a shank including a platform and a root portion (a dovetail). The platform and the shroud are known as a substantial wall defining a passage for fuel gas discharged from a combustion chamber.

The fuel gas flows through the turbine from the combustor at extremely high temperature and therefore heats not only the blade body but also the shroud and the platform. Since the heat leads to thermal deformation of each rotor blade, a gap is preliminarily provided between the platforms adjacent to each other in order to deal with the thermal deformation.

While the gap prevents contact between the thermally-deformed rotor blades, the gap also causes leakage of the fuel gas from the passage. The fuel gas leaking from the passage heats the shank and the root portion of each rotor blade, the rotor disk, and other surrounding members. In order to avoid an excessive rise in temperature of the shanks of the rotor blades and the rotor disk, cooling gas is supplied from a compressor to flow around the rotor disk. The larger amount of the cooling gas used for avoiding the excessive rise in temperature degrades fuel consumption (specific fuel consumption (SFC)) of a turbine engine.

The leakage of the fuel gas from the passage also leads to a decrease in the amount of flow and pressure of the fuel gas in the passage to decrease the efficiency of the turbine. Therefore, the leakage of the fuel gas from the passage is preferably minimized, while the contact between the rotor blades is prevented. Japanese Unexamined Patent Application Publication Nos. H09-303107 (PLT 1), H10-196309 (PLT 2) and 2011-032985 (PLT 3) disclose a structure using a seal member for preventing leakage of fuel gas between rotor blades.

SUMMARY

As disclosed in PLT 1 to PLT 3, sealing the gap between the platforms adjacent to each other with the seal member is a way to prevent the leakage of the fuel gas described above. However, the seal member supported by only one of the rotor blades provided on both sides of the gap cannot exhibit sufficient sealing performance with respect to the other rotor blade. When the seal member is supported by the both rotor blades interposing the gap, the rotor blades should be fixed to the rotor disk with the seal member held between the respective rotor blades, leading to a decrease in efficiency upon fixing the rotor blades.

In view of the above problems, an object of the present disclosure is to provide a seal structure for a gas turbine rotor blade capable of both preventing leakage of fuel gas from a passage and improving efficiency of fixation of rotor blades An aspect of the present disclosure is a seal structure for a gas turbine rotor blade arranged at a rotor shaft in a circumferential direction and extending in a radial direction of the rotor shaft, the seal structure including: a plurality of rotor blades each including a blade body, a shank including a platform and a root portion, and a fin projecting forward of the blade body from the shank; and a wedge seal member and a spline seal member positioned between the respective rotor blades adjacent to each other. The shank includes a first side surface, a second side surface, and a bottom surface located inward in the radial direction from the fin. The first side surface includes a recess extending in a direction from a front side to a rear side of the blade body to house the wedge seal member movably in the radial direction and the circumferential direction, and a first slot extending in a direction from the platform to the root portion and open on the bottom surface to serve as an insertion opening for the spline seal member. The second side surface includes a second slot provided at a position corresponding to the first slot provided in the shank of the rotor blade adjacent to the corresponding shank in which the second slot is provided and open on the bottom surface to serve as the insertion opening for the spline seal member. The recess includes an inclined surface extending straight inward in the radial direction and away from the side surface. The wedge seal member includes a wedge portion including a first wedge surface to be opposed to the inclined surface and a second wedge surface to be opposed to the second side surface of the adjacent rotor blade to form a top portion of a wedge together with the first wedge surface, and a weight portion integrated with the wedge portion and positioned inward in the radial direction from the wedge portion in the recess.

The first wedge surface may be parallel to the inclined surface, and the second wedge surface may be parallel to the second side surface of the adjacent rotor blade.

The wedge seal member may have a stick-like shape elongated in its longitudinal direction. The wedge seal member may include a projection projecting in a direction away from the wedge portion at least at one of ends in the longitudinal direction. The first side surface may communicate with the recess and include a housing groove for housing the projection. The housing groove may include an inner surface for regulating rotation of the wedge seal member housed in the recess.

A depth of the recess in the circumferential direction may be set to a value such that the wedge seal member housed in the recess does not protrude from the first side surface.

The present disclosure can provide a seal structure for a gas turbine rotor blade capable of both preventing leakage of fuel gas from a passage and improving efficiency of fixation of rotor blades.

BRIEF DESCRIPTION OF THE DRAWINGS

FIG. 3A is a three-dimensional view of a wedge seal member according to one embodiment of the present disclosure, and FIG. 3B is a front view and a side view of the wedge seal member shown in FIG. 3A.

FIG. 4A is a cross-sectional view of the wedge seal member and a peripheral portion thereof, and FIG. 4B is a view for illustrating a sealed state obtained by the wedge seal member.

DESCRIPTION OF THE EMBODIMENTS

An embodiment of the present disclosure will be described below with reference to FIG. 1 to FIG. 7.

Figure 1:
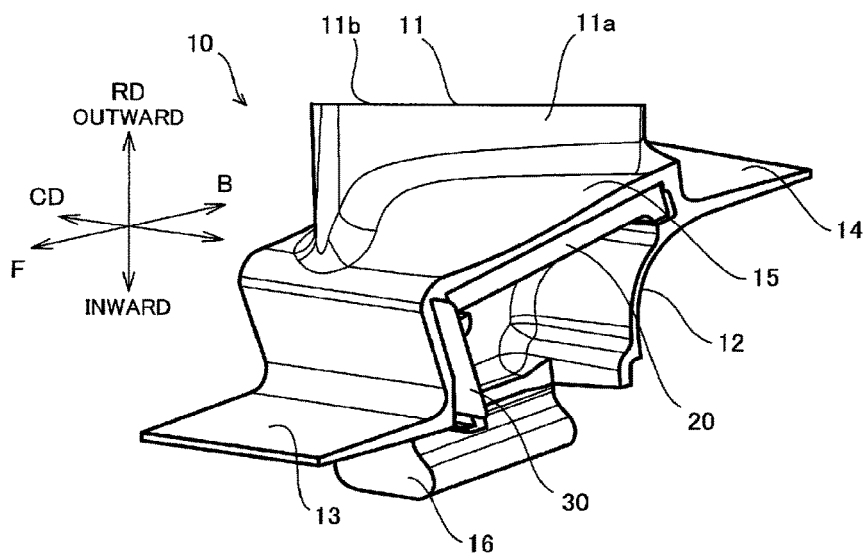
FIG. 1 is a seal structure for a gas turbine rotor blade according to one embodiment of the present disclosure.

FIG. 1 is a view showing a seal structure for a gas turbine rotor blade according to one embodiment of the present disclosure. The seal structure according to the present embodiment includes a plurality of rotor blades (gas turbine rotor blades) 10 used for a turbine (a gas turbine) in a gas turbine engine, and a wedge seal member 20 and a spline seal member 30 positioned between the respective rotor blades 10 adjacent to each other. The gas turbine engine may be used for any purposes. For example, the gas turbine engine may be used for a turbojet engine for aircraft. The present embodiment may be used to fabricate any turbine such as a high-pressure turbine, a medium-pressure turbine, and a low-pressure turbine. Hereinafter, for illustration purposes, one of the rotor blades 10 may be referred to as a rotor blade 10A, and another rotor blade 10 located next to the rotor blade 10A may be referred to as a rotor blade 10B. In each case, reference numeral 10 is also indicated together.

The respective rotor blades 10 are arranged along a rotor disk (not shown), serving as a rotor shaft, in a circumferential direction CD and extend in a radial direction RD of the rotor disk (not shown). FIG. 1 illustrates one of the plural rotor blades 10 described above. One wedge seal member 20 and one spline seal member 30 are also illustrated in the same manner.

Each of the rotor blades 10 includes a blade body 11, a shank 12, and a front fin (a fin) 13 protruding forward of the blade body 11 from the shank 12 (in the direction F in FIG. 1). As shown in FIG. 1, the rotor blade 10 may include a rear fin 14 protruding rearward of the blade body 11 from the shank 12 (in the direction B in FIG. 1). The blade body 11, the shank 12, the front fin 13, and the rear fin 14 are integrally formed by casting, for example.

The blade body 11 has a pressure surface 11a and a suction surface 11b facing in the circumferential direction CD and extending from a platform 15 in the radial direction RD. A shroud (not shown) may be provided at a top end of the blade body 11 in the radial direction RD. The shape of the blade body 11 may be determined as appropriate and depending on the specifications of the turbine.

Figure 2A:
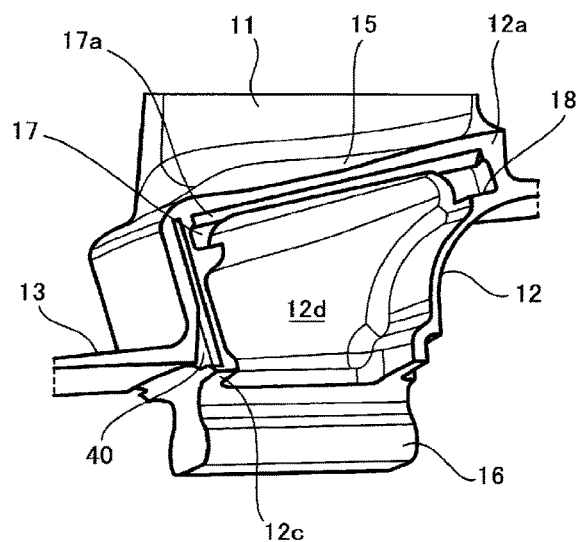
FIG. 2A and FIG. 2B are side views of a shank according to one embodiment of the present disclosure.
Figure 2B:
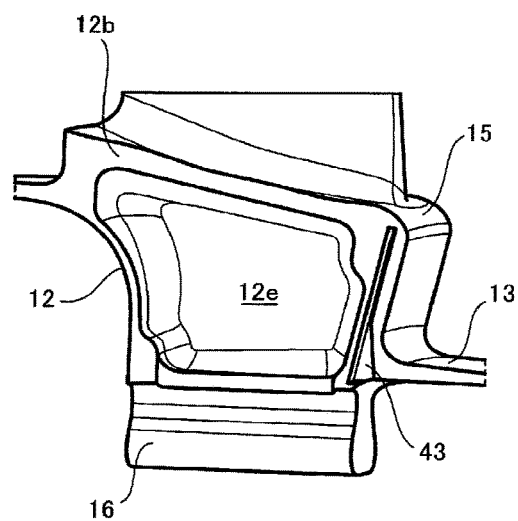

FIG. 2A and FIG. 2B are side views of the shank 12 according to one embodiment of the present disclosure. As shown in the drawings, the shank 12 includes the platform 15 and a root portion 16. In other words, the shank 12 connects the platform 15 and the root portion 16. The platform 15 is a substantial wall defining a passage for fuel gas discharged from a combustor (not shown). The root portion 16 is fitted to a fixing groove (not shown) formed in the rotor disk (not shown) so that the rotor blade 10 is fixed to the rotor disk (not shown).

As shown in FIG. 2A and FIG. 2B, the shank 12 has a side surface (a first side surface) 12a, another side surface (a second side surface) 12b, and a bottom surface 12c located inward in the radial direction RD from the front fin 13. The two rotor blades 10 adjacent to each other in the circumferential direction CD are arranged such that the side surface (the first side surface) 12a of one rotor blade 10 (10A) is opposed to the side surface (the second side surface) 12b of the other rotor blade 10 (10B) with a predetermined gap G (refer to FIG. 4B) interposed between the respective side surfaces. The gap G is set to a value such that the platforms (the shanks) of the both rotor blades do not come into contact with each other upon deformation due to thermal expansion or vibration. The dimensions of the gap G are minimized because the gap G influences a flow of the fuel gas in the passage to cause leakage of the fuel gas from the passage. For example, the gap G is set approximately in a range from 0.2 to 0.5 mm (10 to 20 mil).

The side surface 12a is provided with a shank pocket 12d as a hollow open in the circumferential direction CD. The side surface 12b is also provided with a shank pocket 12e in the same manner. These shank pockets 12d and 12e contribute to a reduction in weight of the rotor blade 10.

Next, a sealed state obtained by the wedge seal member 20 is described below. As shown in FIG. 2A, the side surface 12a has a recess 17. The recess 17 is provided at a position closer to the blade body 11 than the shank pocket 12d (namely, at an outer surface of the platform 15 (a surface facing the passage of the fuel gas (a passage surface))), and extends in a direction from the front side to the rear side of the blade body 11. As used herein, the direction from the front side to the rear side of the blade body 11 refers to the direction F or a direction combining the direction F and the radial direction RD, for example. The recess 17 houses the wedge seal member 20 in a movable manner in the radial direction RD and the circumferential direction CD. The present embodiment exemplifies, but is not limited to, a case in which the recess 17 communicates with the shank pocket 12d.

The depth of the recess 17 in the circumferential direction CD is set to a value such that the wedge seal member 20 housed in the recess 17 does not protrude from the first side surface 12a (namely, from the shank 12). In particular, the greatest length of the wedge seal member 20 in the circumferential direction CD when inserted most deeply to the recess 17 is the same or shorter than the depth of the recess 17 in the circumferential direction CD. The contact of the wedge seal member 20 with the rotor blade is thus avoided when the rotor blade is attached to the rotor disk (not shown).

As shown in FIG. 2A and FIG. 4A, the recess 17 has at least an inclined surface 17a as an inner surface. The inclined surface 17a extends straight inward in the radial direction RD and away from the side surface 12a. A wedge surface (a first wedge surface) 21a of a wedge portion 21 of the wedge seal member 20 slidably comes into contact with the inclined surface 17a.

FIG. 3A is a three-dimensional view of the wedge seal member 20 according to one embodiment of the present disclosure, and FIG. 3B is a front view and a side view of the wedge seal member 20 shown in FIG. 3A. As shown in the drawings, the wedge seal member 20 has a stick-like shape elongated in a longitudinal direction and having a substantially triangular cross section perpendicular to the longitudinal direction. As described above, the wedge seal member 20 is housed in the recess 17 movably in the radial direction RD and the circumferential direction CD. The wedge seal member 20 is made of a material having high heat resistance and mechanical strength. Such a material may be an alloy or a ceramic matrix composite, for example.

The wedge seal member 20 includes the wedge portion 21 and a weight portion 22. The wedge portion 21 is formed into a wedge having a triangular cross section and includes the wedge surface (the first wedge surface) 21a to be opposed to the inclined surface 17a. The wedge surface 21a is parallel to the inclined surface 17a of the recess 17 and slidably brought into contact with the inclined surface 17a.

The wedge portion 21 further includes another wedge surface (a second wedge surface) 21b. The wedge surface 21b is opposed to the second side surface 12b (refer to FIG. 4A and FIG. 4B) of the rotor blade 10 adjacent to the wedge surface 21b (namely, the corresponding rotor blade 10), and defines a top portion 21c of the wedge together with the wedge surface 21a. The wedge surface 21b is parallel to the side surface (the second side surface) 12b of the rotor blade 10 (10B) and slidably brought into contact with the side surface 12b. The side surface 12b of the rotor blade 10 (10B) has the same shape as the side surface (the second side surface) 12b of the rotor blade 10 (10A). Therefore, the wedge surface 21b is also parallel to the side surface 12a of the rotor blade 10 (10A).

The weight portion 22 is integrated with the wedge portion 21 and positioned inward in the radial direction RD from the wedge portion 21 in the recess 17. More particularly, when the wedge seal member 20 is housed in the recess 17, at least a part of the wedge portion 21 including the top portion 21c is located between the inclined surface 17a and the side surface 12b, and the rest of the wedge portion 21 and the weight portion 22 are located inward in the radial direction RD from at least the part of the wedge portion 21. In the present embodiment, the weight portion 22 is positioned in the shank pocket 12d. The weight portion 22 has greater dimensions (size) and is heavier than the wedge portion 21. The weight portion 22 thus functions as a beam for reinforcing the wedge portion 21 and as a weight for applying centrifugal force acting outward in the radial direction RD to the wedge seal member 20.

As shown in FIG. 3B, the weight portion 22 may have a surface 22a on the same plane as the wedge surface 21a of the wedge portion 21, and a surface 22b on the same plane as the wedge surface 21b of the wedge portion 21. The surface 22b is slidably brought into contact with the side surface 12b of the rotor blade 10 (10B) in the same manner as the wedge surface 21b. The surface 22b may be formed to be distant from the side surface 12b of the rotor blade 10 (10B) more than the wedge surface 21b.

The weight portion 22 may have any cross section which fulfills the conditions with regard to the surface 22b described above. The cross section of the weight portion 22 may be similar to the cross section of the wedge portion 21, as shown in FIG. 3B, or may have any other configurations. The dashed and dotted line 24 shown in FIG. 38 indicates the boundary between the wedge portion 21 and the weight portion 22 for illustration purposes; however, the boundary is not limited to the position indicated in FIG. 3B.

Figure 5:
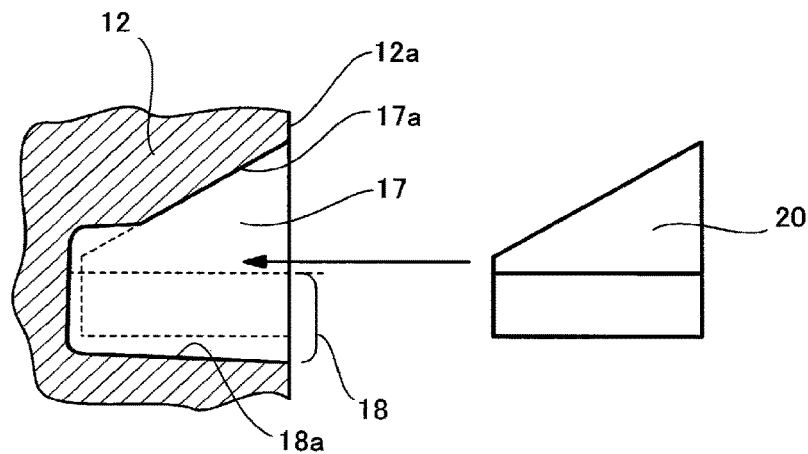
FIG. 5 is a view showing a housing groove according to one embodiment of the present disclosure.

The wedge seal member 20 may include a projection 23 projecting in a direction away from the wedge portion 21 at least at one of both ends (right and left ends in FIG. 3A) in the longitudinal direction. As shown in FIG. 5, FIG. 2A, and FIG. 4A, the side surface 12a of the shank 12 has a housing groove 18 communicating with the recess 17 so as to house the projection 23. As shown in FIG. 4A, the housing groove 18 has an inner surface 18a for regulating rotation of the wedge seal member housed in the recess 17.

The depth of the housing groove 18 from the side surface 12a in the circumferential direction CD is set to a value such that the wedge seal member 20 housed in the recess 17 does not protrude from the first side surface 12a (namely, from the shank 12), as in the case of the recess 17.

As described above, the wedge seal member 20 is movably housed in the recess 17 having the inclined surface 17a. As shown in FIG. 4A, the wedge portion 21 is positioned between the inclined surface 17a and the side surface 12b. When the rotor blade 10 rotates together with the rotor disk (not shown), the centrifugal force acting outward in the radial direction RD is thus applied to the wedge seal member 20.

FIG. 4B illustrates the wedge seal member 20 presumed to be located at a position indicated by the dotted line. The gap G shown in FIG. 4B between the side surface 12a of the shank 12 of the rotor blade 10 (10A) and the side surface 12b of the shank 12 of the rotor blade 10 (10B) is indicated on an enlarged scale with emphasis on the wedge seal member 20 and its dimensions for illustration purposes. When the centrifugal force is applied to the wedge seal member 20, the wedge seal member 20 moves outward in the radial direction RD in the recess 17, and the wedge surface (the first wedge surface) 21a of the wedge portion 21 comes into contact with the inclined surface 17a of the recess 17. The wedge seal member 20 further moves outward in the radial direction RD (in the obliquely upper right direction in FIG. 4B) along the inclined surface 17a after the contact, and the wedge surface (the second wedge surface) 21b of the wedge portion 21 comes into contact with the side surface 12b of the rotor blade 10 (10B). The wedge seal member 20 finally reaches to be kept at a position indicated by the solid line.

The centrifugal force is continuously applied to the wedge seal member 20 with the wedge surface 21a pressed against the inclined surface 17a during the rotation of the rotor blade 10, while the movement of the wedge seal member 20 is prevented by the inclined surface 17a and the side surface 12b. Since the centrifugal force causes reaction force from the inclined surface 17a toward the wedge surface 21a, the wedge seal member 20 is pressed against the side surface 12b. These pressure forces cause the wedge seal member 20 to adhere to the inclined surface 17a and the side surface 12b. Accordingly, the sealed state is ensured between the wedge seal member 20 and the inclined surface 17a and between the sedge seal member 20 and the side surface 12b. Since this sealed state is achieved by the surface contact, the sealing performance is improved as compared with a case of using a seal member exhibiting substantial line contact, such as a rod pin.

According to the present embodiment, both the centrifugal force applied to the wedge portion 21 and the centrifugal force applied to the weight portion 22 are used for achieving the sealed state. It is known that centrifugal force is proportional to a mass of an object. The weight portion 22 is not required to come into contact with the inclined surface 17a, so as to be designed flexibly to have a wider range of dimensions (size) than the wedge portion 21 for achieving the sealed state. In view of such circumstances, the weight portion 22 according to the present embodiment has a greater size and mass than the wedge portion 21. The centrifugal force applied to the weight portion 22 is therefore greater than the centrifugal force applied to the wedge portion 21 and increases the pressure force of the wedge portion 21 against the inclined surface 17a and the side surface 12b accordingly. In other words, the weight portion 22 serves as an auxiliary member to increase the sealing performance The wedge seal member 20 is placed and completely housed in the recess 17 of the rotor blade 10. The wedge seal member 20 is held in the recess 17 with volatile grease. When the rotor blade 10 (10B) is attached next to the rotor blade 10 (10A) fixed to the rotor disk (not shown), the wedge seal member 20 attached to the rotor blade 10 (10A) is not brought into contact with the rotor blade 10 (10B). Accordingly, the efficiency of fixing the rotor blades to the rotor disk is improved.

Figure 7A:
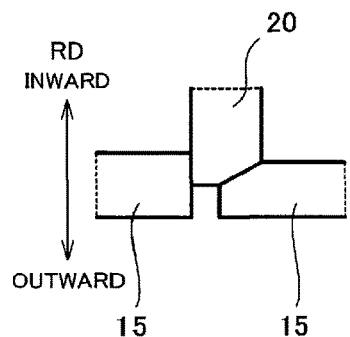
FIG. 7A is a schematic diagram showing the seal structure using the wedge seal member according to the present embodiment.
Figure 7B:
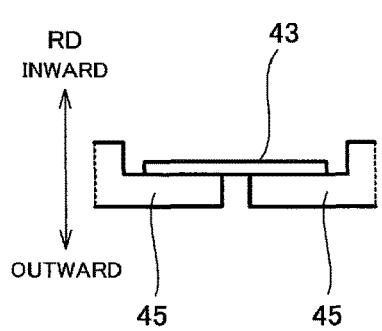
FIG. 7B and FIG. 7C are schematic diagrams showing seal structures of comparative examples.
Figure 7C:
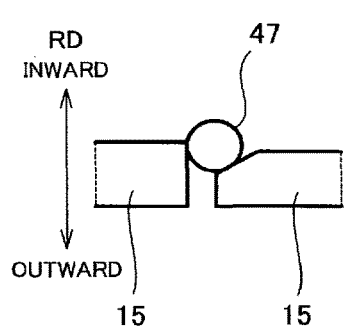

FIG. 7A is a schematic diagram showing the seal structure using the wedge seal member according to the present embodiment, and FIG. 7B and FIG. 7C are schematic diagrams showing seal structures of comparative examples.

FIG. 7A is a diagram showing the wedge seal member 20 according to the present embodiment. The wedge seal member 20 is placed between the two platforms 15 and 15 according to the present embodiment. FIG. 7B is a diagram showing a seal member 43 of the first comparative example. The seal member 43 is a flat plate and placed on outer surfaces (passage surfaces) of two platforms 45 and 45 to cover a gap between the two platforms 45 shown in FIG. 7B. FIG. 7C is a diagram showing a seal member 47 of the second comparative example. The seal member 47 is a rod pin having a circular cross section and placed between the two platforms 15 and 15 of the present embodiment. The seal member 47 of the second comparative example is in line contact with the respective platforms 15. The gap between the respective platforms in each case subjected to a test is set to a predetermined common value as a reference value.

Figure 7D:
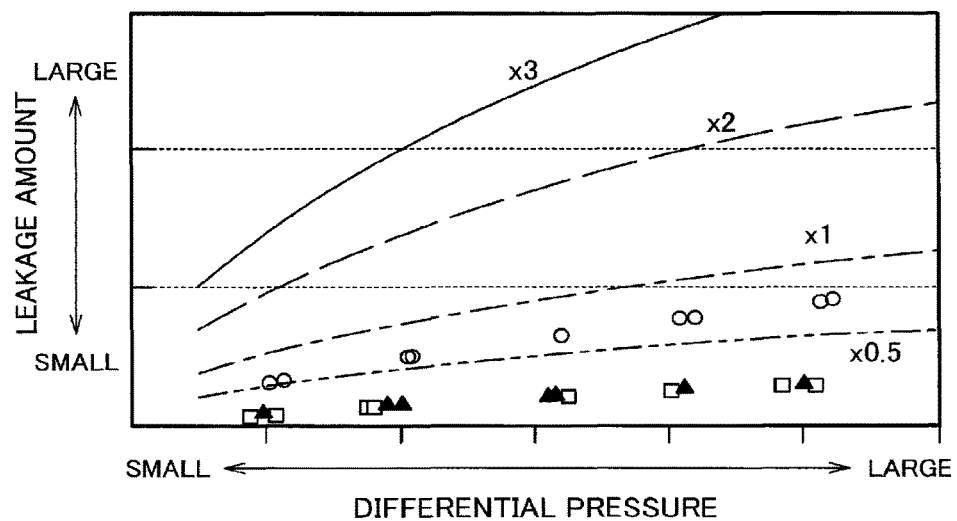
FIG. 7D is a graph showing results of a Rig test for examining sealing performance of the respective seal structures shown in FIG. 7A to FIG. 7C.

FIG. 7D is a graph showing results of a Rig test for examining the sealing performance of the respective seal structures shown in FIG. 7A to FIG. 7C. The squares shown in FIG. 7D denote the test results of the first comparative example, the circles denote the test results of the second comparative example, and the triangles denote the test results of the present embodiment. The axis of abscissas represents a differential pressure of gas at a boundary defined by the platforms shown in FIG. 7A to FIG. 7B, and the axis of ordinates represents the amount of leakage. As used herein, the differential pressure refers to a difference in pressure of the gas on the outer side of the platforms (the lower side in the drawings) with respect to the gas on the inner side of the platforms (the upper side in the drawings) in the radial direction RD presumed. The pressure on the outer side (the lower side in the drawings) is constantly higher than the pressure on the inner side (the upper side in the drawings) in each case. The wedge seal member 20 and the seal member 47 are each pressed against the corresponding platforms by the centrifugal force corresponding to a value presumed from the weight (mass) of the respective seal members. The rod-like seal member 47 of the second comparative example is lighter than the wedge seal member 20 according to the present embodiment, and the pressure force against the seal member 47 is smaller than the pressure force against the wedge seal member 20. For example, the pressure force against the seal member 47 in the present test is set to 60% of the pressure force against the wedge seal member 20. The pressure force in each case is applied in the same direction from the inner side to the outer side in the radial direction RD (from the upper side to the lower side in the drawings). Since the seal member 43 of the first comparative example is light, the centrifugal force is hardly applied to the seal member 43 under the presumed conditions. Therefore, the seal member 43 is not pressed but merely placed with its weight on the respective inner surfaces (the surfaces on the opposite side of the passage surfaces) of the platforms 45 in this test.

The four lines in the graph each indicate the amount of leakage when the dimensions of the gap between the two platforms vary without the gap sealed. The dashed and dotted line denotes a case on the presumption that the gap is set to a reference value. The dashed and double-dotted line, the broken line, and the solid line denote respectively a case on the presumption that the gap is set to be half of the reference value, a case on the presumption that the gap is set to be twice as large as the reference value, and a case on the presumption that the gap is set to be three times as large as the reference value.

The comparison between the seal structure according to the present embodiment and the case indicated by the dashed and dotted line shows that the amount of leakage in the present embodiment is decreased to approximately a quarter of the amount of leakage in the case in which the gap is open, since the seal structure according to the present embodiment precisely seals the gap between the two platforms. The amount of leakage in the present embodiment is substantially the same as the amount of leakage in the first comparative example. The test revealed that the sealing performance of the present embodiment is equivalent to the sealing performance of the first comparative example presumed to exhibit the widest surface contact with the platforms.

As compared with the second comparative example, the present embodiment can improve the sealing performance due to the surface contact. The test revealed that the seal member in surface contact with the both platforms can achieve sufficient sealing performance without extending over the respective platforms adjacent to each other across the gap between the two platforms.

Figure 6A:
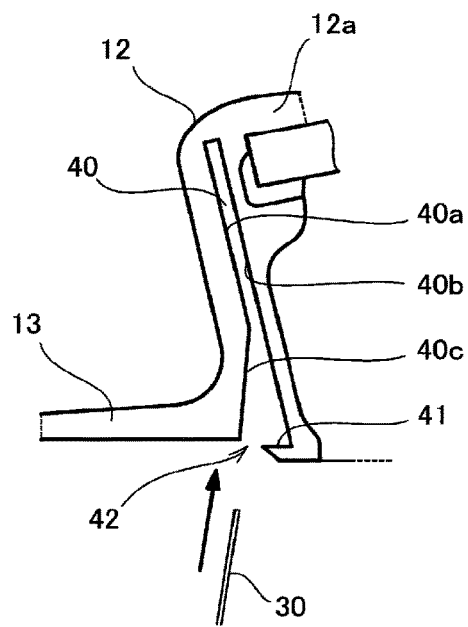
FIG. 6A is a view showing a slot according to one embodiment of the present disclosure.
Figure 6B:
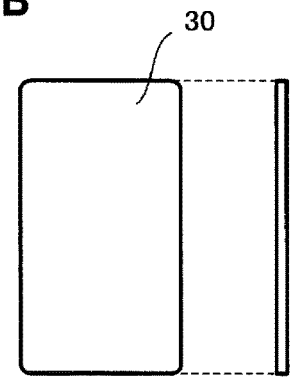
FIG. 6B is a front view and a side view showing a spline seal member according to one embodiment of the present disclosure.
Figure 6C:
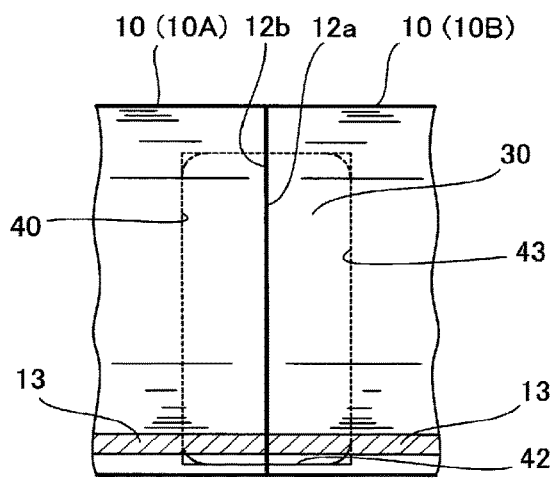
FIG. 6C is a view showing a state in which the spline seal member is inserted in each slot of rotor blades adjacent to each other.

Next, a sealed state obtained by the spline seal member 30 is described below. FIG. 6A is a view showing a slot 40 according to one embodiment of the present disclosure, FIG. 6B is a front view and a side view showing the spline seal member 30 according to one embodiment of the present disclosure, and FIG. 6C is a view showing a state in which the spline seal member 30 is inserted in the respective slots 40 and 41 of the rotor blades 10A and 10B adjacent to each other.

As shown in FIG. 2A and FIG. 6A, the side surface 12a has a slot (a first slot) 40. The slot 40 is elongated in a direction from the platform 15 to the root portion 16 and open on the bottom surface 12c of the shank 12 so as to serve as an insertion opening 42 for the spline seal member 30.

As shown in FIG. 6A, the slot 40 has two inner surfaces 40a and 40b. The inner surface 40a and the inner surface 40b are opposed to each other and extend in the direction from the platform 15 to the root portion 16. The inner surface 40a has an inclined surface 40c inclined toward the insertion opening 42 in a direction away from the inner surface 40a. The inner surface 40b is located on the rear side of the inner surface 40a and continuously flat. The slot 40 is thus widened into a flaring state toward the insertion opening 42. The flaring state facilitates the insertion of the spline seal member 30 through the insertion opening 42.

The inner surface 40b projects forward around the bottom surface 12c to form a receiving portion (a claw portion) 41. The receiving portion 41 is a part of the edge of the insertion opening 42 and receives the spline seal member 30 inserted to the slot 40 so as to prevent the spline seal member 30 from falling off.

As shown in FIG. 2B, the side surface 12b has a slot (a second slot) 43. The slot 43 is formed such that the slot 43 and the slot 40 are mirror images of each other with respect to a plane surface perpendicular to the circumferential direction CD. The slot 43 differs from the slot 40 in being formed on the inner surface 12b but is elongated in the direction from the platform 15 to the root portion 16 and open on the bottom surface 12c of the shank 12 so as to serve as the insertion opening 42 for the spline seal member 30 in the same manner as the slot 40. The slot 43 is located at a position corresponding to the slot (the first slot) 40 provided in the shank 12 of the rotor blade 10 adjacent to the corresponding shank 12 in which the slot 43 is provided.

As shown in FIG. 6B, the spline seal member 30 is a rectangular thin plate. As in the case of the wedge seal member 20, the spline seal member 30 is made of a material having high heat resistance and mechanical strength. Such a material may be an alloy or a ceramic matrix composite, for example. In addition, the spline seal member 30 has elasticity sufficient to be bent at the time of being inserted to the insertion opening 42.

FIG. 6C illustrates a state in which the side surface 12a of the rotor blade 10 (10A) is opposed to the side surface 12b of the rotor blade 10 (10B) so that the respective openings of the slot 40 of the rotor blade 10 (10A) and the slot 43 of the rotor blade 10 (10B) are aligned in the circumferential direction CD to form the insertion opening 42 for the spline seal member 30. The spline seal member 30 has a width narrower than the total width of the slot 43 and the slot 40 arranged next to each other, and has a length shorter than a length of the slot 43 and the slot 40 in the extending direction. The spline seal member 30 inserted via the insertion opening 42 is thus entirely housed in a belt-like space defined by the slot 43 and the slot 40.

The pressure inside the shank pockets 12d and 12e is normally lower than the pressure outside the shank pockets 12d and 12e during the operation of the turbine. The fuel gas flowing around the front fin 13 tends to flow into the shank pockets 12d and 12e through a gap between the side surface 12a and the side surface 12b. The spline seal member 30 blocks this gap. Since the pressure difference described above is caused between the front side and the rear side of the spline seal member 30, the spline seal member 30 adheres to the inner surface 40b, for example. Accordingly, a sealed state is ensured between the spline seal member 30 and the inner surface 40b of the slot 40. The sealed state is also ensured between the spline seal member 30 and the slot 43 in the same manner.

The insertion opening 42 has a distinctive feature which is open on the bottom surface 12c. Namely, the insertion opening 42 is located inward in the radial direction RD from the front fin 13. The spline seal member 30 is therefore inserted to the slots 40 and 43 via the insertion opening 42 on the opposite side of the passage of the fuel gas with the platform 15 interposed between the slots and the passage. Since the insertion opening 42 does not face (is not open toward) the passage of the fuel gas, the insertion opening 42 has no influence on a flow of the fuel gas (a main flow between the rotor blades).

The slots 40 and 43 are widened into a flaring state toward the insertion opening 42. The spline seal member 30 thus can be recognized visually from the insertion opening 42 after the spline seal member 30 is completely housed in the slots 40 and 43. Accordingly, appropriate attachment of the spline seal member 30 can be confirmed at the time of fixation of the rotor blades.

According to the present disclosure, the wedge seal member 20 prevents the leakage of the fuel gas flowing in the radial direction RD, and the spline seal member 30 prevents the leakage of the fuel gas flowing from the front side to the rear side of the rotor blades 10. An excessive rise in temperature of the shank 12 and the root portion 16 of the rotor blade 10, the rotor disk, and other surrounding members is thus prevented. Accordingly, the amount of cooling gas supplied to these components can be reduced, so as to improve the fuel consumption (specific fuel consumption (SFC)) of the turbine engine.

Since the wedge seal member 20 is only required to be attached to one of the two rotor blades 10 adjacent to each other when the rotor blades 10 are fixed to the rotor disk, damage to the rotor blades 10 caused by the wedge seal member 20 can be reduced, so as to improve the efficiency of fixation of the rotor blades 10. The present disclosure thus can provide the seal structure for a gas turbine rotor blade capable of both preventing the leakage of the fuel gas from the passage and improving the efficiency of fixation of the rotor blades. It should be understood that the present disclosure is not intended to be limited to the embodiment described above, and that the present disclosure is defined by the appended claims and covers all modifications, equivalents and alternatives falling within the scope of the appended claims.

What is claimed is:

1. A seal structure for a gas turbine rotor blade, the seal structure comprising:
first and second rotor blades arranged and adjacent to each other in a circumferential direction of a rotor shaft and extending in a radial direction of the rotor shaft, each of the first and second rotor blades including a blade body, a shank including a platform and a root portion, and a fin projecting forward of the blade body from the shank; and
a wedge seal member and a spline seal member positioned between the first and second rotor blades,
each shank including a first side surface, a second side surface, and a bottom surface located inward in the radial direction from the fin,
the first side surface of the first blade including a recess extending in a direction from a front side to a rear side of the blade body, and a first slot extending in a direction from the platform to the root portion and open on the bottom surface,
the second side surface of the second blade including a second slot extending in the direction from the platform to the root portion and open on the bottom surface,
the recess of the first blade including an inclined surface extending straight inward in the radial direction and away from the first side surface,
the wedge seal member being housed movably in the radial direction and the circumferential direction in the recess of the first rotor blade, the wedge seal member including a wedge portion and a weight portion integrated with the wedge portion, the weight portion being positioned radially inward of the wedge portion in the recess of the first rotor blade,
the wedge portion including a first wedge surface and a second wedge surface, the first wedge surface being opposed to the inclined surface of the recess of the first rotor blade and the second wedge surface being opposed to the second side surface of the second rotor blade, the first wedge surface and the second wedge surface forming a top portion of the wedge, the first slot including a first receiving portion projecting forward from an inner surface of the first slot, the second slot including a second receiving portion projecting forward from an inner surface of the second slot, the first slot of the first rotor blade and the second slot of the second rotor blade forming an insertion opening for the spline seal member, and the first receiving portion of the first rotor blade and the second receiving portion of the second rotor blade are formed as part of an edge of the insertion opening to receive the spline seal member provided in the first slot of the first rotor blade and the second slot of the second rotor blade.

2. The seal structure according to claim 1, wherein:

the first wedge surface is parallel to the inclined surface; and the second wedge surface is parallel to the second side surface of the second rotor blade.

3. The seal structure for a gas turbine rotor blade according to claim 2, wherein:

the wedge seal member is elongated in a longitudinal direction of the wedge seal member;

the wedge seal member has a projection projecting in a direction away from the wedge portion at at least one of ends of the wedge seal member in the longitudinal direction;

the first side surface of the first blade has a housing groove connected with the recess to house the projection of the wedge seal member; and the housing groove has an inner surface for regulating rotation of the wedge seal member housed in the recess.

4. The seal structure according to claim 1, wherein a depth of the recess in the circumferential direction is set to a value such that the wedge seal member housed in the recess does not protrude from the first side surface of the first blade when the wedge seal member is inserted most deeply into the recess.

5. The seal structure according to claim 2, wherein a depth of the recess in the circumferential direction is set to a value such that the wedge seal member housed in the recess does not protrude from the first side surface of the first blade when the wedge seal member is inserted most deeply into the recess.

6. The seal structure according to claim 3, wherein a depth of the recess in the circumferential direction is set to a value such that the wedge seal member housed in the recess does not protrude from the first side surface of the first blade when the wedge seal member is inserted most deeply into the recess.

* * * * *